April 21, 1953 S. DOBA, JR 2,636,080

BALANCED DIODE CLAMPER CIRCUIT FOR LOW-FREQUENCY RESTORATION

Filed Jan. 26, 1949

INVENTOR
S. DOBA, JR.
BY Hugh S. Wertz
ATTORNEY

Patented Apr. 21, 1953 2,636,080

UNITED STATES PATENT OFFICE 2,636,080

BALANCED DIODE CLAMPER CIRCUIT FOR LOW-FREQUENCY RESTORATION

Stephen Doba, Jr., Whippany, N. J., assignor to Bell Telephone Laboratories, Incorporated, New York, N. Y., a corporation of New York Application January 26, 1949, Serial No. 72,927

4 Claims. (Cl. 178—7.3)

This invention relates to the reinsertion of direct current and/or low frequency components of electrical signals, and particularly to the reinsertion of such components in television systems. Such circuits are frequently called clampers or clamper circuits. A clamper or clamper circuit can be defined as a device which measures the departure of a wave, during intervals in which the wave has a supposedly fixed amplitude, from said fixed amplitude and adds to the wave a signal which reduces this departure.

Various circuits have been proposed for the reinsertion of the direct current and/or low frequency components in television systems where the components have been suppressed during transmission as, for example, where they are suppressed by transformers or by alternating current amplifiers. Among the various proposed circuits are the so-called "keyed" circuits of the general type described in Patent 2,299,945 to K. R. Wendt, issued October 27, 1942. In the "keyed" circuit there is included an electron discharge device which is made conducting periodically (that is, it is "keyed") by means of synchronizing pulses or the like to change the charge on a condenser in the grid circuit of the discharge device which is to have the reinserted direct current in its output. All of the circuits of this type depend for their operation upon a specific characteristic of the signal to be transmitted, namely, that at certain periodic intervals the signal assumes a fixed or datum value. A standard television video signal is one that has this characteristic inasmuch as the tips of the synchronizing pulses which are a part of the signal are originally all at the same voltage level. In the course of transmission, it may occur that the synchronizing pulses are displaced, one with respect to the other, either by virtue of frequency distortion, such as would be caused by transformers, etc. in the transmission paths, or by the addition of extraneous signals or interference of unwanted signals. Then, as is well known in the art, these effects may be reduced by the periodic restoration of the datum levels of the signal to a fixed value. The signal so reconstituted will be the more completely free of the unwanted effects the more slowly the latter varies in time compared to the periodic restoration rate.

In the operation of pulse-operated low frequency restoring circuits such as that shown in the Wendt patent, it has been discovered that distortion caused by the resistance and unbalance of the diodes used in clampers, and their driver circuits, is reduced by the application of negative feedback during the periods of the pulses. The present invention is based on this discovery and is in this way different from the Wendt circuit and others now in common use.

It is an object of this invention to provide improved direct current and/or low frequency components reinserting correction apparatus and especially to provide improved reinserting apparatus of the "keyed" type.

It is another object of this invention to reduce distortion in the direct-current reinserting circuit of the "keyed" type, and particularly those distortions caused by the resistance and unbalance of the electronic keying devices and their driver circuits.

In accordance with a specific illustrative embodiment of the invention, the charge of a condenser in the grid circuit of a vacuum tube is controlled by means of two diodes which are keyed by periodically recurring pulses, such as synchronizing pulses. Upon the occurrence of a synchronizing or keying pulse, the diodes are rendered conducting and the condenser will discharge therethrough a certain amount, if its charge should be reduced to provide the correct direct current reinsertion, or it will charge a certain amount therethrough if its charge should be increased. Each diode is driven by a respective driver amplifier and, in accordance with the invention, the gains of the two amplifiers are made different in order to provide a negative feedback during the periods of the pulses, which has the effect of reducing distortion caused by the resistance and unbalance of the diode restorers and their driver circuits.

The invention will be more readily understood by referring to the following description taken in connection with the accompanying drawings forming a part thereof in which.

Figure 1:
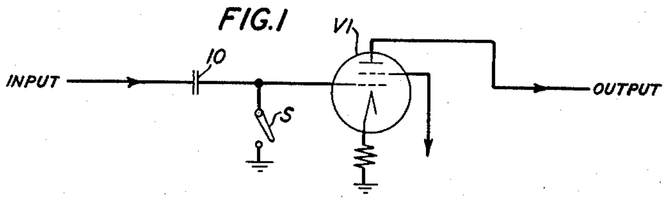
Figs. 1 and 2 are simplified schematic circuit diagrams to aid in the explanation of the background of the invention.

Referring more particularly to the drawings, Fig. 1 shows a greatly simplified means for producing reinsertion of the direct-current and/or low frequency components into the signal from which they have been removed. In this figure, the input signal is applied to the grid of the vacuum tube V1 by means of the coupling condenser 10. The output or reconstituted signal is obtained from the anode of the tube V1 as shown. The restoration of the datum values of the signal to a fixed value, zero with respect to ground in this case, is achieved by means of the switch S. The operation of the switch S is assumed to be such that it is open for all signal times except when the signal should be at its datum or reference value. At these times the switch is closed and the condenser 10 is shorted to ground. The size of the condenser 10 is assumed to be small enough, in terms of the impedance of the input source and the duration of the closure of the switch S, that condenser 10 will be fully charged to the value of the input voltage. It may be readily seen that for the interval immediately following the opening of the switch S, the potential of the grid of the vacuum tube V1 must start from zero, or ground potential, in following the input signal as the latter varies.

Figure 2:
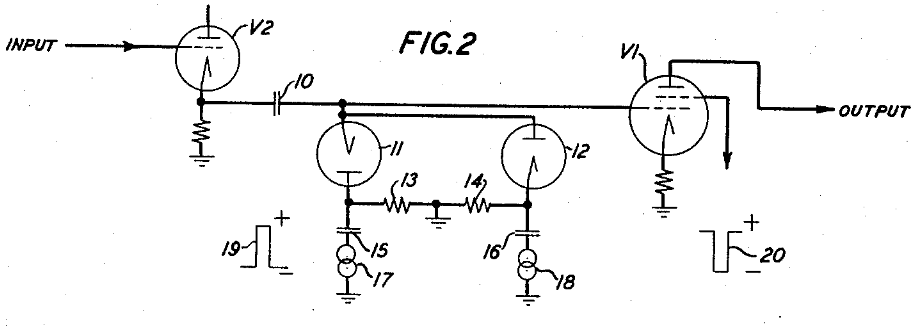

A practical form of the switch S is shown in Fig. 2. In this figure, the condenser 10, the so-called "clamping" condenser, is shown as a coupling condenser between the cathode of tube V2 and the grid of vacuum tube V1. The input signal is applied to the grid of vacuum tube V2 while the output signal is available at the anode of vacuum tube V1. The functions of the switch S are now performed by diodes 11 and 12 in conjunction with resistances 13 and 14, respectively, and coupling condensers 15 and 16, respectively. The keying pulses from the sources 17 and 18 are applied respectively to the anode of diode 12 and to the cathode of diode 12 in such a polarity, as shown in wave forms 19 and 20, respectively, as to cause the diodes to conduct only for the duration of these keying pulses. Condensers 15 and 16 will become charged negatively and positively, respectively, as indicated on the drawing, due to these conduction currents, so as to render diodes 11 and 12 nonconducting whenever the keying pulses are not present. The function of resistors 13 and 14 is to provide a slow reduction in the charges on condensers 15 and 16. The replenishing of these charges by diodes 11 and 12 thus assures that the latter will have relatively low impedances to ground for the duration of the keying pulses. It is to be understood that the keying pulses from sources 17 and 18 coincide in time with the datum or reference value of the input signal. Hence, the clamping condenser 10 may be charged or discharged, as required, through diodes 11 and 12, and the operation of the circuit of Fig. 2 is thus equivalent to the operation of the circuit of Fig. 1.

A disadvantage of the circuit of Fig. 2, however, resides in the fact that it is possible for the keying pulses from sources 17 and 18 to appear at the grid of vacuum tube V1 and hence also to appear in the output circuit thereof.

Although it has been claimed for some prior art circuit arrangements of this character that it is possible to balance out the keying pulses and thus prevent them from mixing with the outputs, as a practical matter it is not possible to do so. Consider the requirements for such a balance to be achieved. First, the keying pulses from sources 17 and 18 must be of the same wave form, exactly equal in amplitude and opposite in polarity. Secondly, the diodes 11 and 12 must be identical in all respects, including internal resistance and capacitance between anode and cathode. The relatively minor problem of balance between capacitance elements 15 and 16 and resistance elements 13 and 14 may be disregarded.

To one versed in the art it will be recognized that these balance requirements in general are extremely difficult to meet. Furthermore, it can be demonstrated that even though theoretically perfect balance were achieved, a practical balance is impossible.

Consider the case when it is necessary for clamping condenser 10 to be charged or discharged due to the presence of an unwanted signal at the input. The flow of this charging, or discharging, current taking place through diodes 11 and 12 must result in an increase in current in one and a decrease in current in the other. Since in any diode the internal impedance is a function of the current flow, this inevitably results in the destruction of that balance which is to be achieved. The net result is that even though a theoretical balance of elements may be achieved, in practice such balance is illusory.

In accordance with the present invention, not only the effect of unbalance in the critical elements but also the effects of the unwanted input signal in destroying that balance are reduced by means of negative feedback. The signal correction circuit of the present invention is one in which the keying circuit is made to operate in a manner approaching that of a metallic short-circuiting switch.

Figure 3:
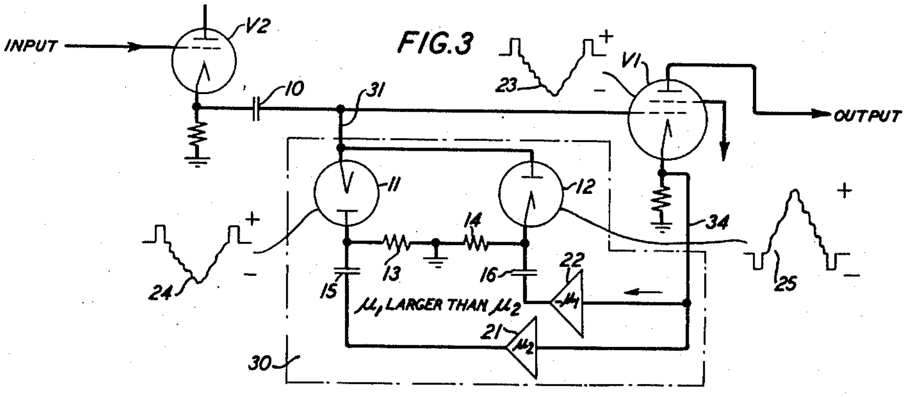
Fig. 3 is a schematic diagram of a direct current reinsertion circuit in accordance with the invention.

An embodiment of the present invention is shown in Fig. 3, in connection with the circuit for the transmission of a standard television video signal. The nomenclature is the same as in Fig. 2 with the addition of amplifiers 21 and 22 supplying the keying pulses to diodes 11 and 12, respectively, by means of a feedback circuit from the cathode of the tube V1. An input signal having the characteristics of a recurrent or periodic datum value, such as the television video signal, is applied at the grid of vacuum tube V2. In this signal there may be present low frequency distortion caused by inadequate transmission elements such as transformers, etc. and/or low frequency noise or interference signals, which are to be reduced or removed. Vacuum tube V2 is used as a cathode follower in order to obtain a low impedance source for coupling the signal to the grid of vacuum tube V1 through the clamping condenser 10. The output signal is available at the anode of the vacuum tube V1. Connected to the juncture of the clamping condenser 10 and the grid of vacuum tube V1 are the cathode of diode 11 and the anode of diode 12. Applied to the anode of diode 11 and to the cathode of diode 12 through capacitance elements 15 and 16, respectively, are amplified versions of the signal appearing at the grid of vacuum tube V1. If the polarity of the signal at the grid of the tube V1 is as shown in wave form 23, with the synchronizing pulses positive, the polarity of signals applied to the anode of the diode 11 and to the cathode of the diode 12 is as shown by wave forms 24 and 25, respectively. If the polarity of the signal at the grid of tube V1 is inverted from that shown, then it is necessary to invert the diodes 11 and 12, that is, to interchange their anode and cathode connections.

The operation of the circuit shown in Fig. 3 is like that described above in connection with Fig. 2 with this main difference—in the arrangement of Fig. 3 the voltage amplification of the amplifier 22 is considerably in excess of the voltage amplification of the amplifier 21 and this is in direct contrast with the arrangement of certain circuits of the prior art. It is the purpose of this excessive amplification in amplifier 22 to provide a net negative feedback around a feedback loop which may be recognized as existing from the grid of tube V1, to the cathode of this tube, through amplifiers 22 and 21 and diodes 12 and 11 back to the grid of tube V1. The analysis of the operation of this feedback loop can be more readily accomplished by means of the diagram of Fig. 4.

Figure 4:
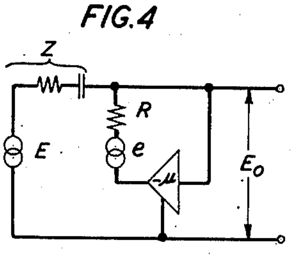
Fig. 4 is a schematic circuit diagram to aid in the explanation of the invention.

In Fig. 4 the impedance of the cathode follower tube V2 and the capacitance of the clamping condenser 10 may be called a generalized impedance Z. The internal impedances of the diodes 11 and 12, including the effective output impedances of amplifiers 21 and 22, are replaced by resistance R. The effective amplification around the loop due to amplifiers 21 and 22 and tube V1 is labeled $-\mu$. The input signal is designated E, while any voltage which appears because of unbalance in the diode is designated by $e$. It may be recognized that this is a perfectly general description of the circuit of Fig. 3.

In Fig. 4 it may readily be shown that the output voltage $E_0$ is given by the expression:

$$E_0=\frac{E\left(\frac{R}{1+\mu}\right)}{\left(\frac{R}{1+\mu}\right)+Z}+\frac{\frac{e}{1+\mu}}{\left(\frac{R}{1+\mu}\right)+Z} \qquad (1)$$

Two important effects due to the feedback may be recognized in this expression. The first is that the disturbing voltage $e$ is reduced in magnitude by the factor $(1+\mu)$ and the second is that the effective internal impedance, R, of the keying circuit is also reduced by the factor $(1+\mu)$.

The importance of the first effect may be appreciated from the foregoing discussion. The importance of the latter effect may be recognized from what has already been mentioned as to the necessity of having the condenser 10 fully charged to the full value required by the unwanted signal in the time interval of the keying or synchronizing pulses. Inasmuch as the time interval is generally short and the effective internal resistance R is fairly large, it has been customary to make the capacitance of the condenser 10 very small in order to achieve this result. This small value of capacitance 10 has undesirable practical drawbacks because of the unavoidable leakage path, mainly between cathode and heater of diode 11 and grid and ground of tube V1. The effect of these leakage paths is to produce an undesirable saw-tooth voltage wave form across the condenser 10 and hence in the output circuit. A feature of the present invention is a reduction in the effective internal impedance of the keying circuit and hence, a permissible increase in the size of capacitance of the condenser 10 with the consequent reduction of the saw-tooth voltage due to leakage.

The relationship between the feedback $(1+\mu)$ in Fig. 4 and the circuit of Fig. 3 may be readily shown to be:

$$1+\mu=1+m\left(\frac{\mu_1-\mu_2}{2}\right) \qquad (2)$$

where $m$ is the voltage amplification from grid to cathode of tube V1 and $\mu_1$ and $\mu_2$ are the voltage amplifications of amplifiers 22 and 21, respectively.

In the circuit of Fig. 3, the effects of unequal keying pulses applied to the two diodes 11 and 12 can be minimized by making the ratio of the resistors 13 and 14 approximately proportional to the ratio of amplification of the amplifiers 21 and 22.

Figure 5:
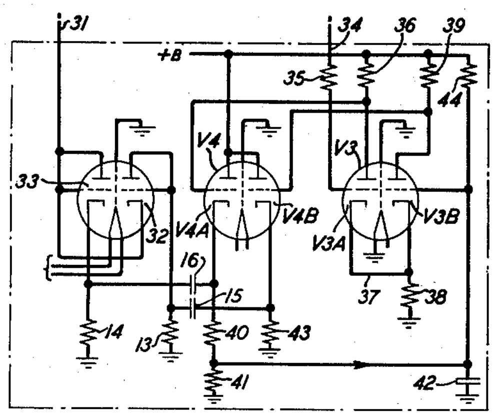
Fig. 5 shows a modification of a portion of the circuit of Fig. 3.

Fig. 5 is a more detailed showing of a circuit arrangement which can be used in place of the arrangement schematically shown within the box 30 in Fig. 3. In the arrangement of Fig. 5, the connection 31 to the output side of the clamping condenser 10 corresponds to the like-numbered connection in Fig. 3, the triodes 32 and 33 (connected as diodes) correspond respectively to the diodes 11 and 12, while the double triodes V4 and V3 together replace the amplifiers 21 and 22 of Fig. 3. Tracing the connections in greater detail, the connection 34 from the cathode of the tube V1 in Fig. 3 has a counterpart in the connection 34 in Fig. 5, this connection being traced through a resistor 35 to the control grid of the left-hand tube V3. The anode of the left-hand tube V3 (called V3A), is connected to a source of B supply through a resistor 36, while the cathode is connected to the cathode of tube V3B through a connection 37, these cathodes being jointly connected to ground through the resistor 38. The anode of the tube V3B is connected to +B through resistor 39.

The anodes of tubes V3A and V3B are respectively connected to the control grids of the tubes V4A and V4B. The cathode of the tube V4A is connected to ground through a pair of resistors 40 and 41 in series, the common terminal of these resistors being connected to ground through a condenser 42 and to the grid of the tube V3B. The purpose of this latter connection is to apply a feedback voltage to the grid of tube V3B to control the amount of difference in the signals applied to the grids of tubes V4A and V4B. The anodes of the tubes V4A and V4B are connected together and are directly connected to +B supply, while the cathode of tube V4B is connected to ground through resistor 43. The cathodes of the tubes V4A and V4B are connected through the coupling condensers 16 and 15 to the triodes 33 and 32, respectively. By varying the resistance ratio of resistors 40 and 41, the output signals of V4A and V4B can be proportioned to make $\mu$ larger than $\mu_1$ by any required amount.

It is to be understood that the above-described arrangements are illustrative of the application of the principles of the invention. It will be obvious that numerous other arrangements may be devised by those skilled in the art without departing from the spirit and scope of the invention.

What is claimed is:

1. In combination, a source of signal voltage of the type which has a first component with recurrent portions at a fixed potential and a second component comprising a low frequency wave caused by distortions or interference, an output circuit, means including a condenser for coupling said source to said output circuit, a pair of unidirectional conducting devices, means for connecting the output circuit side of said condenser to a point of fixed potential through two parallel circuits containing respectively said devices connected so that one is reversely poled with respect to the other, and an excitation circuit connected between said output circuit and said devices for causing said devices to conduct during the intervals when the first component of said signal has its portions at fixed potential, said circuit including amplifiers for furnishing two voltages of different magnitudes to said devices, respectively.

2. In combination, a source of signal voltage of the type which has a first component with recurrent portions at a fixed potential and a second component comprising a low frequency wave caused by distortions or interference, an electron discharge device having input and output circuits, means including a condenser for coupling said source to the input circuit of said electron discharge device, a pair of unidirectional conducting devices, means for connecting the side of said condenser which is connected to said electron discharge device to a point of fixed potential through two parallel circuits containing respectively said unidirectional conducting devices connected so that one is reversely poled with respect to the other, and an excitation circuit connected between the output circuit of said electron discharge device and said unidirectional conducting devices for causing said unidirectional devices to conduct during the intervals when the first component of said signal has its portions at fixed potential, said circuit including amplifiers for furnishing two unequal voltages to said devices, respectively.

3. In combination, a source of signal voltage of the type which has a first component with recurrent portions at a fixed potential and a second component comprising a low frequency wave caused by distortions or interference, an output circuit, means including a condenser for coupling said source to said output circuit, a pair of unidirectional conducting devices which may have unavoidable dissimilarities therein, means for connecting the output circuit side of said condenser to a point of fixed potential through two parallel circuits containing respectively said devices connected so that one is reversely poled with respect to the other, and an excitation circuit connected between said output circuit and said unidirectional devices for causing said devices to conduct during the intervals when the first component of said signal has its portions at fixed potential, said circuit including amplifiers for furnishing two unequal voltages to said devices, respectively, the relation between said unequal voltages being such that the resulting negative feedback through a loop including the diodes corrects for distortion effects caused by said unavoidable dissimilarities in the diodes.

4. In combination, a source of signal voltage of the type which has a first component with recurrent portions at a fixed potential and a second component comprising a low frequency wave caused by distortions or interference, an output circuit, means including a condenser for coupling said source to said output circuit, a pair of unidirectional conducting devices, means for connecting the output circuit side of said condenser to a point of fixed potential through two parallel circuits containing respectively said devices connected so that one is reversely poled with respect to the other, and means for simultaneously exciting, from said output circuit, said devices to the conducting state during the intervals when the first component of said signal has its portions at fixed potential, said last-mentioned means including means for applying two unequal voltages to said devices, respectively, comprising a pair of substantially equal tubes connected in substantially push-pull relation and each having input and output circuits, means for connecting said two last-mentioned output circuits respectively to said unidirectional conducting devices, a pair of driving tubes each having input and output circuits for said substantially equal tubes, means for connecting the output circuit coupled to said condenser to the input circuit of one of said pair of driving tubes, means for connecting the output circuit of said one of said pair to the input circuit of said other of said pair, means for connecting the output circuits of said driving tubes to the input circuits respectively of said substantially equal tubes, and means for feeding back energy from the output circuit of one of said last-mentioned tubes to the input circuit of said other of said pair of tubes to provide control for the degree of unbalance of said two unequal voltages applied to said unidirectional conducting devices, respectively.

STEPHEN DOBA, Jr.

References Cited in the file of this patent

UNITED STATES PATENTS

| Number | Name | Date |
|---|---|---|
| 2,258,732 | Blumlein et al. | Oct. 14, 1941 |
| 2,286,450 | White et al. | June 16, 1942 |
| 2,299,945 | Wendt | Oct. 27, 1942 |
| 2,307,375 | Blumlein et al. | Jan. 5, 1943 |
| 2,363,813 | Somers | Nov. 28, 1944 |

OTHER REFERENCES

RCA Review, March 1948, vol. IX, #1, pages 101–106.